US008606711B2

(12) United States Patent
Florek et al.

(10) Patent No.: US 8,606,711 B2
(45) Date of Patent: Dec. 10, 2013

(54) POS PAYMENT TERMINAL AND A METHOD OF DIRECT DEBIT PAYMENT TRANSACTION USING A MOBILE COMMUNICATION DEVICE, SUCH AS A MOBILE PHONE

(75) Inventors: Miroslav Florek, Bratislava (SK); Michal Masaryk, Bratislava (SK)

(73) Assignee: Logomotion, S.R.O. (SK)

( * ) Notice: Subject to any disclaimer, the term of this patent is extended or adjusted under 35 U.S.C. 154(b) by 239 days.

(21) Appl. No.: 12/899,378

(22) Filed: Oct. 6, 2010

(65) Prior Publication Data

US 2011/0112968 A1    May 12, 2011

Related U.S. Application Data

(63) Continuation of application No. PCT/IB2010/051915, filed on May 1, 2010.

(30) Foreign Application Priority Data

| May 3, 2009 | (SK) | ......................................... 32-2009 |
| Mar. 27, 2010 | (SK) | ................................. 50009-2010 |
| Apr. 8, 2010 | (SK) | ................................. 50012-2010 |
| Apr. 19, 2010 | (SK) | ................................. 50016-2010 |

(51) Int. Cl.
  *G06Q 40/00* (2012.01)
(52) U.S. Cl.
  USPC .............................. 705/41; 705/14.23; 705/73
(58) Field of Classification Search
  USPC .......................................... 705/14.23, 41, 73
  See application file for complete search history.

(56) References Cited

U.S. PATENT DOCUMENTS

| 5,288,979 A | 2/1994 | Kreft |
| 5,303,198 A | 4/1994 | Adachi et al. |
| 5,574,470 A | 11/1996 | de Vall |

(Continued)

FOREIGN PATENT DOCUMENTS

| CN | 1450782 | 10/2003 |
| CN | 1627321 | 6/2005 |

(Continued)

OTHER PUBLICATIONS

"Intelligent Mouse", IBM Technical Disclosure Bulletin, International Business Machines Corp., Thornwood, US, Feb. 1, 1995, 38(2), p. 463.

(Continued)

*Primary Examiner* — Calvin Cheung
(74) *Attorney, Agent, or Firm* — Woodcock Washburn LLP (57) ABSTRACT

A payment terminal using a mobile communication device (4), such as a mobile phone, is located on a removable memory card (1), e.g. type microSD card, which is adjusted in such a way so it can be inserted into an additional hardware slot, e.g. memory slot. A payment POS terminal application runs on a removable memory card (1), which contains at least one payment card. The payment card's unit (7) with the card's payment application is located in the secured part of the memory, separately from the terminal's configuration data unit (6). The configuration data of the terminal's selected identity and the payment card's data are located in the separate parts of the secure element or in completely independent secure elements or they can also be localized in the Sales Device of the merchant and there e.g. within the ICC card (29) or SAM card (42).

12 Claims, 8 Drawing Sheets

(56) References Cited

U.S. PATENT DOCUMENTS

| | | |
|---|---|---|
| 5,578,808 A | 11/1996 | Taylor |
| 5,608,417 A | 3/1997 | de Vall |
| 6,062,472 A | 5/2000 | Cheung |
| 6,070,795 A | 6/2000 | Feiken |
| 6,070,796 A | 6/2000 | Sirbu |
| 6,154,181 A | 11/2000 | Hu-Guo et al. |
| 6,323,064 B1 | 11/2001 | Lee et al. |
| 6,450,407 B1 | 9/2002 | Freeman et al. |
| 6,615,243 B1 | 9/2003 | Meggeid et al. |
| 6,745,935 B1 | 6/2004 | Grieu et al. |
| 6,828,670 B2 | 12/2004 | Hayana et al. |
| 6,976,011 B1 | 12/2005 | Capitant et al. |
| 7,083,085 B1 | 8/2006 | Daniels et al. |
| 7,364,092 B2 | 4/2008 | Narendra et al. |
| 7,374,100 B2 | 5/2008 | Jei et al. |
| 7,436,965 B2 | 10/2008 | Sherman |
| 7,458,518 B2 | 12/2008 | Fukuda et al. |
| 7,481,358 B2 | 1/2009 | Honjo et al. |
| 7,568,065 B2 | 7/2009 | D'Athis |
| 7,581,678 B2 | 9/2009 | Narendra et al. |
| 7,689,932 B2 | 3/2010 | Maktedar |
| 7,775,442 B2 | 8/2010 | Saarisalo |
| 7,775,446 B2 | 8/2010 | Ochi et al. |
| 7,805,615 B2 | 9/2010 | Narendra et al. |
| 7,828,214 B2 | 11/2010 | Narendra et al. |
| 8,055,184 B1 | 11/2011 | DiMartino et al. |
| 8,127,999 B2 | 3/2012 | Diamond |
| 8,355,670 B2 * | 1/2013 | White ............................ 455/41.1 |
| 2001/0005832 A1 | 6/2001 | Cofta et al. |
| 2001/0033013 A1 | 10/2001 | Lee |
| 2002/0062249 A1 | 5/2002 | Iannacci |
| 2002/0147658 A1 | 10/2002 | Kwan |
| 2002/0163479 A1 | 11/2002 | Lin |
| 2003/0055738 A1 | 3/2003 | Alie |
| 2003/0105930 A1 | 6/2003 | Okamoto |
| 2003/0138135 A1 | 7/2003 | Chung et al. |
| 2004/0066278 A1 | 4/2004 | Hughes et al. |
| 2004/0087339 A1 | 5/2004 | Goldthwaite et al. |
| 2004/0127256 A1 | 7/2004 | Goldthwaite et al. |
| 2005/0072595 A1 | 4/2005 | Cho |
| 2005/0092835 A1 | 5/2005 | Chung et al. |
| 2005/0116050 A1 | 6/2005 | Jei et al. |
| 2005/0125745 A1 | 6/2005 | Engestrom |
| 2005/0222949 A1 | 10/2005 | Inotay et al. |
| 2005/0269401 A1 | 12/2005 | Spitzer et al. |
| 2005/0269402 A1 | 12/2005 | Spitzer et al. |
| 2006/0143578 A1 | 6/2006 | Maktedar |
| 2006/0146023 A1 | 7/2006 | Kidron |
| 2006/0152288 A1 | 7/2006 | Peng et al. |
| 2006/0186209 A1 | 8/2006 | Narendra et al. |
| 2006/0219776 A1 | 10/2006 | Finn |
| 2006/0224470 A1 | 10/2006 | Garcia Ruano et al. |
| 2006/0226217 A1 | 10/2006 | Narendra et al. |
| 2006/0255160 A1 | 11/2006 | Winkler |
| 2007/0014407 A1 | 1/2007 | Narendra et al. |
| 2007/0014408 A1 | 1/2007 | Narendra et al. |
| 2007/0016957 A1 | 1/2007 | Seaward et al. |
| 2007/0050871 A1 | 3/2007 | Mashhour |
| 2007/0083772 A1 | 4/2007 | Harada et al. |
| 2007/0106564 A1 | 5/2007 | Matotek et al. |
| 2007/0125840 A1 | 6/2007 | Law et al. |
| 2007/0152035 A1 | 7/2007 | Adams et al. |
| 2007/0158438 A1 | 7/2007 | Fukuda et al. |
| 2007/0171079 A1 | 7/2007 | Saito et al. |
| 2007/0233615 A1 | 10/2007 | Tumminaro |
| 2007/0235539 A1 | 10/2007 | Sevanto et al. |
| 2007/0241180 A1 | 10/2007 | Park et al. |
| 2007/0278290 A1 | 12/2007 | Messerges et al. |
| 2007/0293155 A1 | 12/2007 | Liao et al. |
| 2008/0011833 A1 | 1/2008 | Saarisalo |
| 2008/0048036 A1 | 2/2008 | Matsumoto et al. |
| 2008/0059375 A1 | 3/2008 | Abifaker |
| 2008/0093467 A1 | 4/2008 | Narendra et al. |
| 2008/0120129 A1 | 5/2008 | Seubert et al. |
| 2008/0207124 A1 | 8/2008 | Raisanen et al. |
| 2008/0233906 A1 | 9/2008 | Mitomo et al. |
| 2008/0250244 A1 | 10/2008 | Baentsch et al. |
| 2008/0270246 A1 | 10/2008 | Chen |
| 2009/0063312 A1 | 3/2009 | Hurst |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 * | 3/2009 | Jain ................................ 705/75 |
| 2009/0070691 A1 | 3/2009 | Jain |
| 2009/0070861 A1 | 3/2009 | Jain |
| 2009/0088077 A1 | 4/2009 | Brown et al. |
| 2009/0098825 A1 | 4/2009 | Huomo et al. |
| 2009/0108063 A1 | 4/2009 | Jain et al. |
| 2009/0119190 A1 | 5/2009 | Realini |
| 2009/0124273 A1 | 5/2009 | Back |
| 2009/0132418 A1 | 5/2009 | Morsillo et al. |
| 2009/0143104 A1 | 6/2009 | Loh et al. |
| 2009/0157936 A1 * | 6/2009 | Goss et al. ..................... 710/264 |
| 2009/0191812 A1 | 7/2009 | Teruyama et al. |
| 2009/0193491 A1 | 7/2009 | Rao |
| 2009/0199206 A1 | 8/2009 | Finkenzeller et al. |
| 2009/0199283 A1 | 8/2009 | Jain |
| 2009/0200371 A1 | 8/2009 | Kean et al. |
| 2009/0261172 A1 | 10/2009 | Kumar et al. |
| 2009/0265544 A1 | 10/2009 | Moona et al. |
| 2009/0265552 A1 | 10/2009 | Moshir et al. |
| 2009/0298540 A1 | 12/2009 | Narendra et al. |
| 2009/0307139 A1 | 12/2009 | Mardikar et al. |
| 2009/0307142 A1 | 12/2009 | Mardikar |
| 2009/0319287 A1 | 12/2009 | Hammad et al. |
| 2010/0012721 A1 | 1/2010 | Jain et al. |
| 2010/0023449 A1 | 1/2010 | Skowronek et al. |
| 2010/0044444 A1 | 2/2010 | Jain et al. |
| 2010/0045425 A1 | 2/2010 | Chivallier |
| 2010/0062808 A1 | 3/2010 | Cha et al. |
| 2010/0063893 A1 | 3/2010 | Townsend |
| 2010/0082490 A1 | 4/2010 | Rosenblatt et al. |
| 2010/0181377 A1 * | 7/2010 | Chen et al. .................... 235/440 |
| 2010/0197224 A1 | 8/2010 | Lahdenniemi et al. |
| 2010/0203870 A1 | 8/2010 | Hubinak et al. |
| 2010/0205432 A1 | 8/2010 | Corda et al. |
| 2010/0213265 A1 | 8/2010 | Narendra et al. |
| 2010/0258639 A1 | 10/2010 | Florek et al. |
| 2010/0262503 A1 | 10/2010 | Florek et al. |
| 2010/0274677 A1 | 10/2010 | Florek et al. |
| 2010/0274726 A1 | 10/2010 | Florek et al. |
| 2010/0323617 A1 | 12/2010 | Hubinak et al. |
| 2011/0264543 A1 * | 10/2011 | Taveau et al. .................. 705/23 |
| 2011/0282753 A1 | 11/2011 | Mullen et al. |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |
| EP | 1943606 A2 | 7/2008 |
| EP | 2390817 | 11/2011 |
| FR | 0611189 | 9/1926 |
| FR | 0611190 | 9/1926 |

(56) References Cited

FOREIGN PATENT DOCUMENTS

| | | |
|---|---|---|
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |
| JP | 2006-033229 | 2/2006 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0012738 | 2/2002 |
| KR | 2002-0051696 | 6/2002 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 03/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/105469 | 9/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO2010/041245 A1 * | 4/2010 ............... G06K 7/06 |
| WO | WO 2010/044041 | 4/2010 |
| WO | WO 2010/097777 | 9/2010 |
| WO | WO 2010/122520 | 10/2010 |
| WO | WO 2010/128442 | 11/2010 |
| WO | WO 2010/131226 | 11/2010 |

OTHER PUBLICATIONS

Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

"EMV Mobile Contactless Payment: Technical Issues and Position Paper", www.emvco.com/mobile.aspx, © Oct. 11, 2007, accessed Apr. 20, 2009, 37 pages.

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure A Smart Card Alliance Contactless Payments Council White Paper", www.smartcardalliance.org, © Sep. 1, 2007, accessed Nov. 7, 2008, 10 pages.

Madlmayar et al., "Management of Multiple Cards in NFC-Deivces", LNCS, 2008, 21 pages.

Wikipedia, "Bluetooth", Wikipedia, The Free Encyclopedia, http://enwikipedia.org/wiki/bluetooth, accessed Apr. 8, 2012, 19 pages.

Wikipedia, "Cellular Frequencies" Wikipedia, The Free Encyclopedia, http://en.wikipedia.org/wiki/cellular_frequencies, accessed Apr. 8, 2012, 5 pages.

* cited by examiner

POS PAYMENT TERMINAL AND A METHOD OF DIRECT DEBIT PAYMENT TRANSACTION USING A MOBILE COMMUNICATION DEVICE, SUCH AS A MOBILE PHONE

CROSS-REFERENCE TO RELATED APPLICATIONS

This application is a continuation of PCT Application No. PCT/IB2010/051915, filed May 1, 2010, which claims priority from Slovak patent applications nos. PP00032-2009, filed May 3, 2009, PP50009-2010, filed Mar. 27, 2010, PP50012-2010, filed Apr. 8, 2010, and PP50016-2010, filed Apr. 19, 2010. The entire disclosure of each of the above-referenced patent applications is hereby incorporated herein by reference.

TECHNICAL FIELD

The solution refers to a payment terminal of a simplified structure that is uses the paying customer's mobile communication device, such as a mobile phone, and which is designed above all for small business premises such as mobile kiosks and similar merchants.

BACKGROUND

The existing POS terminals are widespread in business premises and they are distinguished by a stable structure, which besides other things includes a communication channel connected to the payment processing centre, a printer, an encryption key, a display, the card reader, which is mainly a reader of different format cards, and also a keyboard for PIN code entering. This kind of technical configuration requires certain space and is relatively expensive. The realizations of known POS terminals are intended for stable sale locations in physical shops, where high costs of purchase, installation and operation of POS terminals are offset by reasonable turnovers of payments for purchases.

The solution according to the published patent WO2008061790 describes a system, in which the POS terminal does not have a communication channel with the payment processing center and uses a mediated connection over customer's mobile phone for it. This solution has lower security since the payment terminal application itself runs on a remote computer and the mobile phone is only a mediator of communication. Other published patents describe a divided POS terminal in such a way in which directly on the payment location there is only its managing part that is connected to the remaining part located in some other part of the shop. The existing solutions and published patents do not offer a simple instruction of how to create a cheap, non-complicated and eventually also portable POS payment terminal, which would create payment cryptograms according to the current standards, especially the EMV standards.

All solutions currently existing require a relatively complicated installation and encompass many input and output devices, which increase their price. Until now, there are known no such devices that would be characterized by both simplicity and high security and that would be portable and usable even in small shops such as in newspaper kiosks or in mobile counters selling fast food.

The important requirement is for the new solution to be compatible with the current payment data structures on the payment processor's level. In practice, it would not be possible to establish a configuration, which would require a completely new hierarchy or possibly a new verification process.

SUMMARY

The deficiencies mentioned are to a great extent eliminated by a POS payment terminal using a mobile communication device, such as a mobile phone, in which the POS payment terminal contains, among other things, a unit for the run of the payment terminal application, a secured memory with identification data for the matching and identification of the merchant, a display, a keyboard and an interface according to this solution, the subject matter of which lies in the fact that the POS payment terminal is formed by a temporary connection of the Sales Device with a removable memory card that is inserted in the slot of the mobile communication device, such as a mobile phone, belonging to the paying customer. The Sales Device can belong to the merchant or it can be held by him and contains a memory with identification data, which above all, encompass data necessary for matching the POS payment terminal to the corresponding merchant's bank account. Basically the Sales Device is formed by hardware, which ensures a correct identity of the temporarily created POS payment terminal.

The important characteristic of the solution presented lies in the fact that the POS terminal is created from temporary connection of two parts. The connection is labeled as temporary, since after the payment process is ended, the parts can be disconnected, the communication channel is interrupted and another new connection between Sales Device and another removable memory card can be created. Naturally, a repeated connection of the beforehand cooperating removable memory card with the Sales Device is also not excluded. The temporality of the connection is understood as a time phase in reality limited by one payment process, while it can be supposed that there is even some time of connection before beginning and after the end of the payment process. The possibility to always pair a new pair of elements on the side of the merchant and the paying customer is a solution, in which it is always possible to create a POS terminal in the mobile communication device of a paying customer, with the POS terminal having the identity of the corresponding merchant.

The Sales Device collocation of words is not a commonly used term in the field of POS payment terminals and under this collocation it is necessary to understand any type of hardware element equipped with corresponding software for the realization of functions according to this description. The Sales Device behaves as a POS payment terminal outwardly and the merchants will usually call it that way in practice, however from the structure and run of the application point of view, the Sales Device is only an important but not sufficient part of the entire POS payment terminal. Therefore, it is necessary to understand the term Sales Device in a general meaning as a part of the terminal, which is basically connected to the merchant, or to the purchase location and ensures the correct routing of debit payments.

In the entire POS payment terminal the Sales Device can have two basic functions—to carry the identity of the POS terminal and to enter the value of the payment. In principle, even a narrower hardware version is possible, in which the payment's value is entered over the keyboard of the mobile communication device. However this kind of version is uncomfortable for the merchant since he would have to control the customer's mobile communication device or he would have to trust the customer to enter the correct payment amount into the payment terminal application. The inserted value could be displayed also on the Sales Device display so the merchant could check it, however it would be much more comfortable if the paid amount was entered through the elements on the merchant's side. The version described in this section with entering the payment value over the mobile communication's device's keyboard would not have to fulfill some standards (e.g. EMV) on the merchant's behavior and operations during debit payment realization, however it is in principle realizable using the principle of the solution presented.

The Sales Device is not able to perform the payment terminal application independently and it does not have to have communication channels for the creation of the connection to the payment processing centre (e.g. a bank, a clearing house etc.). The hardware set is capable of fulfilling all basic functions of a common POS payment terminal only by connection of Sales Device of the merchant to the removable memory card, inserted into the customer's mobile communication device. The temporary connection can be basically created for the realization of each individual payment, while it can always be a different communication device on the side of different customers. Exactly the mobile communication device is capable to create the necessary connection to the payment centre thanks to the existing GSM/GPRS (Global System for Mobile Communications/General packet radio service). However, this connection does not have to be created during each payment since the solution according to our description is capable of processing off-line and on-line payments.

The important element of the POS payment terminal according to the solution presented is a removable memory card, which also contains hardware and software elements in order for the set made of Sales Device and mobile communication device to be capable to run and execute the payment terminal application, which in the process view forms the kernel of the debit, for example, payment operation, directly on the removable memory card. Since the set made of Sales Device and the mobile communication device does not have to be equipped with the external payment card's reader, it will be suitable if even secured memory with at least one payment card unit, will be directly on the removable memory card. Also a unit for the run of payment terminal application and the communication element for the connection to Sales Device will be on the removable memory card. Besides the secured memory with identification data of the POS payment terminal, the Sales Device can also contain a communication element for the connection to the removable memory card. Thanks to these elements the POS payment terminal is created with the help of a common mobile phone with the slot for the card which extends memory. So the removable memory card can encompass generic payment terminal which will become a specific payment terminal with unique identity only after it connects with Sales Device. The Sales Device will give a clear identification, for the benefit of who should the payment be made, to this temporary connection. Since there is interest in this function even in the mobile phones without an NFC (Near Field Communication) communication element, such NFC communication element can be included directly on the removable memory card. In principle, the connection between the mobile communication device and Sales Device can be in the form of contact interface, however that would require a complicated unification of the connectors and problems with compatibility. Therefore it will be suitable, if not only solution, for the connection between the Sales Device and removable memory card to be in the form of an NFC communication channel, which is widely standardized.

Thanks to the described configuration it will be possible for the merchant to have only a very simple Sales Device, which will carry the information on identity, terminal's number and to that one an account number of the corresponding merchant can be assigned in the payment processor centre. This kind of Sales Device will be very small and simple. It can be in the form of a small box with a display and keyboard through which the merchant will enter the required payment amount. The identification data can be stored directly in the corresponding element on the printed circuit of Sales Device, or they can be stored on the ICC (integrated circuit card) card or on other carriers as e.g. up until now known SAM (Security Authentication Module) cards with cryptographic key. In this version a SAM card of the size of a common SIM card (Subscriber Identity Module) that is available after taking off the cover of the Sales Device. SAM card is inserted into Sales Device before the first activation.

The customer will tap his mobile communication device to the Sales Device. By tapping it a NFC communication channel will be created and information on the identity of this temporarily created POS payment terminal will be sent from the Sales Device into the removable memory card. Then the identification data can be encrypted by a Master Key that is stored within the Secure Element in the Sales Device. Under the term Secure Element we can understand especially, however not exclusively, a secured memory with necessary interface that can be in the form of an independent chip with a corresponding computing capacity. The Secure Element can be configured in such a way so the data that are stored in it cannot be accessed from the outside but can be used as input parameters for the realization of computing operation within the Secure Element. Only the results of these computing operations e.g. in the form of cryptograms get out of the Secure Element. The input data from the Sales Device will become the basis for the run of the payment terminal application after they are read on the removable memory card. The payment-terminal application can be loaded in indifferent form, without its own identity on the removable memory card. Basically, after the creation of the temporary connection between the Sales Device and the removable memory card, the general, generic, indifferent terminal will transform into a particular POS terminal, which is assigned to a corresponding merchant into the system. This phase forms some kind of preparation on the start of the new one-time POS terminal. Subsequently, a payment terminal application e.g. of the EMV type can run during the connection in a similar way as in standard POS terminals as it is up till now.

The encryption of the POS terminal's identification data can be done using a Master Key, which in general can be and mostly even will be different from the encryption keys, which are used later on by the payment terminal application for the creation of the payment cryptogram. The Master Key can be e.g. from the supplier of the Sales Device hardware and encryption keys of the payment-terminal application can be issued by a bank or a payment processor. The difference of the encryption keys in practice will be conditional on different requests of individual entities operating in the payment clearing system.

From the increase of security point of view even the entry about the payment amount can be encrypted during the transfer from the Sales Device to the mobile communication device. By this the risk that the paying user could lower the payment value even before the payment terminal application kernel is run is lowered. This kind of change would show itself on the final confirmation of the payment on the side of the merchant in the form of displaying the paid amount, however in case of inobservance and routine approach the merchant would not have to notice the change in the amount.

The configuration in which the communication with the unit of the selected payment card is done directly on the removable memory card during the run of the payment terminal application is suitable. Several units of independent payment cards can be stored on the removable memory card and that either on the physical separate secure elements or on independent domains of one secure element. In this configuration the payment terminal application can run directly on the removable memory card and the data on the customer's payment card are not sent over external readers and neither into internet area, a fact that has positive impact on the security of the payment operation.

The Sales Device can be in different forms; besides a small single-purpose box with a keyboard, which contains the Secure Element with identification data directly, it can be created even in such a way that within it is a created reader of external cards preferably of classical standard ICC (integrated circuit card) card format. Then the sensitive data can be loaded into the chip of this kind of card. The card's chip also contains a certain memory capacity which can be used suitably for the entry of data on realized payment transactions. After the day is over, the merchant can leave the basic part of the Sales Device in the shop, e.g. in the newspaper stand and take only the ICC card with him. In case he takes ICC card from the Sales Device, he can take it for processing into the bank or he can back up the data from it in his home computer by using a reader. In case the merchant has several mobile stands, there can be several Sales Devices combined with one ICC card with identification data of one terminal and one banking account and on the other hand one Sales Device can be used successively with several ICC cards belonging to different merchants within multiple shift business premises of one store.

It is suitable, but not necessary, if Sales Device has its own interface, e.g. of the USB format for the connection to extending accessories, which enables for the payment data to be printed directly from Sales Device, or respectively over this connector it is possible to connect the payment card reader, GPRS modem and similar.

BRIEF DESCRIPTION OF THE DRAWINGS

The solution is explained in detail on the FIGS. 1 to 8.

On the FIG. 1, there is schematic demonstration of the outside perspective on the mobile communication device in the form of a common mobile phone, which is placed near the Sales Device. Measurements, shape nor proportion ratio of the mobile communication device to Sales Device are not obligatory and are chosen only with the view of better clarity of the scheme. In the figure, the mobile phone and the Sales Device do not overlay for the purpose of increasing the clearness of the figure, however in reality the mobile phone can be placed directly to the surface of the Sales Device.

On the FIG. 2 there is a perspective on the basic structure of the Sales Device, where it is also visible that the communication element on the side of the mobile phone is located in the removable memory card. The memory with the identification data of the POS terminal is located in the removable memory card. The memory with the identification data of the POS terminal is located in the SAM card. On the FIG. 2 there is also the NFC communication channel between the removable memory card and Sales Device.

On the FIG. 3 there is schematic structure of the removable memory card with an indifferent POS payment terminal unit and with four independent payment card's units belonging to different banks. Above the scope of basic functions, the removable memory card is supplemented also for a common flash memory.

On the FIG. 4 there is a scheme of the Sales Device structure in the configuration where the ICC card of the merchant is inserted into the body of the reader.

On the FIG. 5 there is a configuration with the connection to cash register. The Sales Device encompasses the ICC card's reader and it also has a mini USB connector.

On the FIG. 6 there is a pre-paid removable memory card with a simplified architecture in the option with two Secure Elements.

On the FIG. 7 there is succession of tasks within payment application running on the removable memory card.

On the FIG. 8, there is a block scheme of the memory card's individual elements with displayed connection between individual elements on the memory card with one divided Secure Element, on which there are protected data from payment POS terminal also from several payment cards.

DETAILED DESCRIPTION OF ILLUSTRATIVE EMBODIMENTS

Example 1

In this example according to the FIGS. 1, 2, 3, 6 to 8 there is described a system where a Sales Device 2, in the form of a single-purpose box, which has a numeric keyboard 13, a display 14 and its own power source in the form of rechargeable accumulator, is located on the merchant's side. The Sales Device 2 has a NFC communication element 11 with an antenna 21 under the surface of the upper cover, where the centre of the antenna 21 is graphically depicted by a guiding symbol 19 of the target on the outside of the cover. In its hardware on the SAM card 24 the Sales Device 2 encompasses a Secure Element 6 into which the POS payment terminal 1 identification and also the Master Key for the encryption of the communicated data is loaded. In other version, the data can be loaded directly in the protected memory on the Sales Device's 2 printed circuit.

Figure 1:
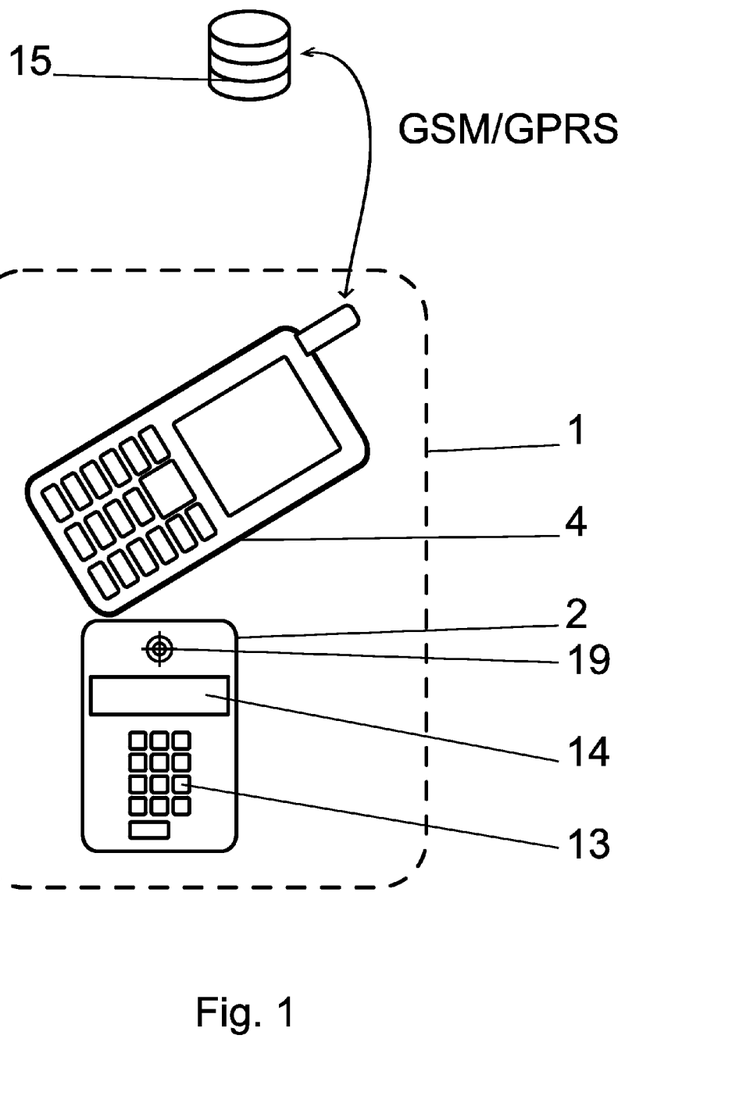
Figure 2:
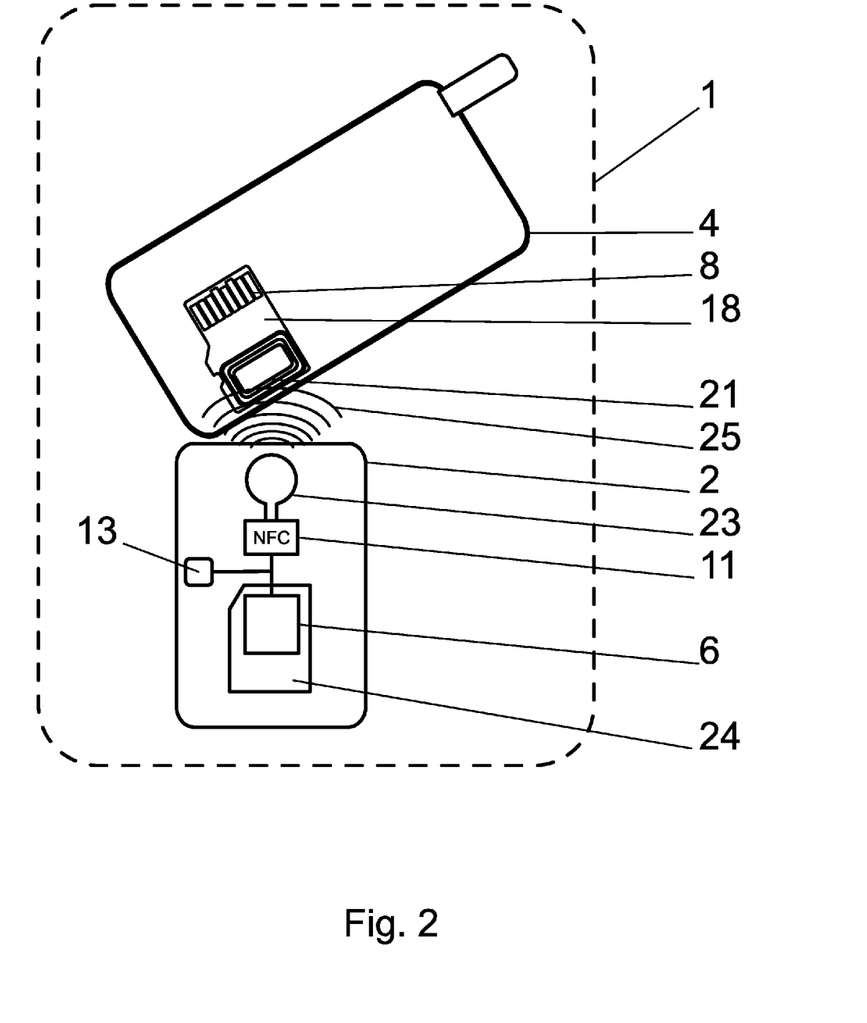
Figure 3:
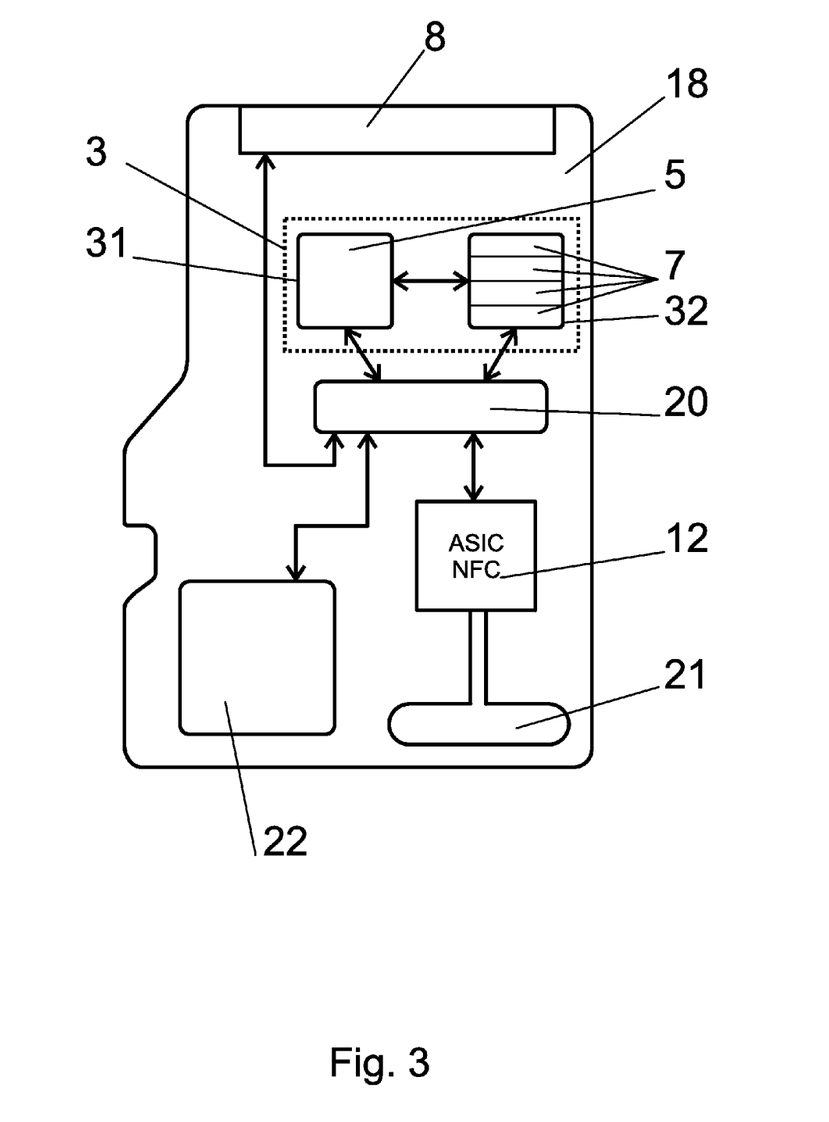

The merchant uses the Sales Device 2 in such a way that when selling he enters the amount he wants for his goods or his service over the keyboard 13 to the display 14. After checking the amount on the display 14, the merchant presses the confirming button. After this act, the POS payment terminal's 1 identification data is encrypted using Master Key and this encryption data, along with the payment amount is sent to the NFC communication element 11 which sends the encrypted message over antenna 21 and expects the mobile communication device 4 to be placed to the Sales Device 2. In his mobile communication device 4 the customer activates the launch of the payment application and he does that e.g. through a special hardware keyboard or over a software button. After the creation of the NFC communication channel, the encrypted data from the Sales Device 2 are read and decrypted, the result of which are the POS terminal's 1 identification data and the required payment amount.

This part of the transfer can be expressed also as $$3DES[Mk\{Cfg\}] \xrightarrow{NFC} 3DES^{-1}[Mk\{Cfg\}] = Cfg,$$

where 3DES means encryption over Triple Data Encryption Algorithm, where Mk is Master Key supplied by the payment processor, where Cfg means configuration data and NFC presents the transfer path between the Sales Device and the removable memory card.

The paid amount can be verified by the customer on the display of his mobile communication device 4. The identification data from the Sales Device 2 serve for the indifferent POS terminal 1 on the removable memory card 18 to become a specific POS payment terminal 1 for the benefit of a given merchant.

This process can be expressed as $$Cfg + \text{Generic POS} = ACg \text{ POS},$$

where Generic POS represents the identification of the indifferent, generic POS and ACg POS is the POS of a corresponding merchant.

Subsequently the payment terminal application runs in the normal way, e.g. according to the EMV standard. According to preset risk management of the payment card 7 and with respect to the value of the amount being paid, it might be requested to enter the password, PIN code, which is entered by the customer on the keyboard of its mobile communication device 4. In this way high security is reached, since the payment terminal application runs directly on the removable memory card 18, where there are stored also the payment cards' 7 units and the sensitive data do not leave the hardware of the connection between the Sales Device 2 and the removable memory card 18. The result of the payment application is the creation of the payment cryptogram, which is sent to the Sales Device 2 and also in the case of online payment is sent over the interface 8 into the mobile communication device 4 and subsequently over the mobile network to the payment processor. The payment cryptogram can be also created and sent according to the relationship:

$$3DES[Mk\{\text{Transaction}\}] \xrightarrow{NFC}$$

pertinently to the payment processor's side as $$3DES[Mk\{\text{Transaction}\}] \xrightarrow{GPRS}$$

The removable memory card is in this case in the form of a microSD card.

Example 2

Figure 4:
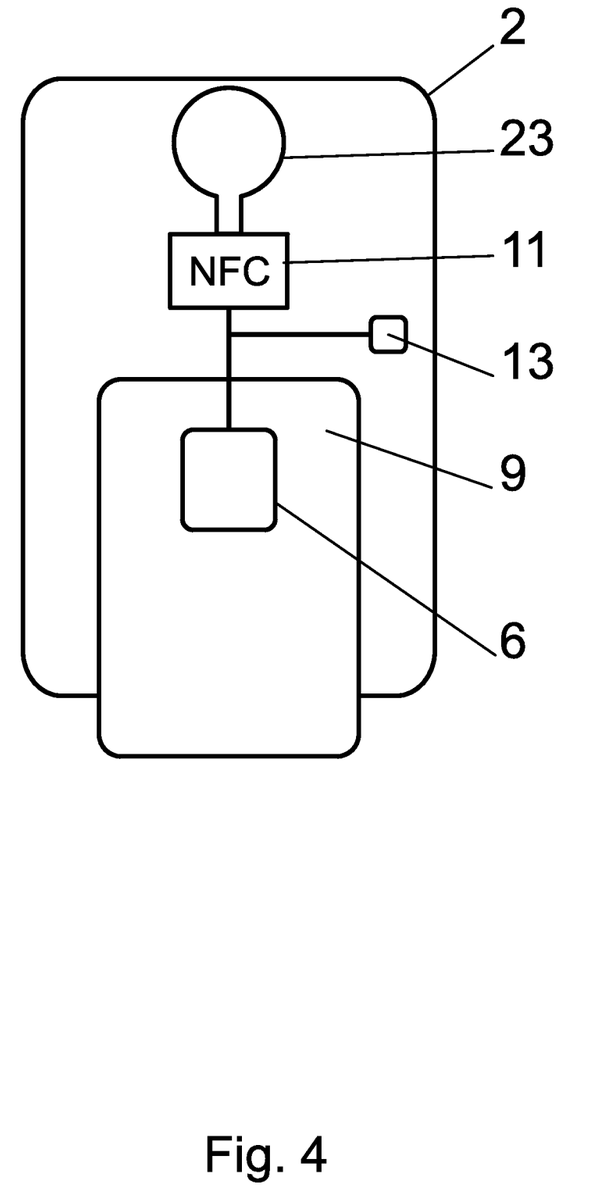

In this example according to the FIG. 4, the Sales Device 2 is in the form of a device, which has a slot for the insertion of the ICC card 9 with the reader of the corresponding format. The merchant can buy the Sales Device 2 anywhere and this Sales Device 2 does not have its own identity. The merchant receives the ICC card 9 of the common parameters according to ISO 7810 85.60×53.98 mm from the bank or the payment processor. The payment processor's Master Key and also the POS terminal's identification data for the assignment to a corresponding merchant are loaded in the Secure Element on the chip of the ICC card. By inserting the ICC card 9 into the reader, the Sales Device 2 according to our description is created. The Sales Device 2 contains also the mini-B USB connector 17, over which it is possible to connect the printer, computer and other output or input units in extended configuration. The attendance and operation of the Sales Device 2 is similar to the first case, however it is different by the fact that after realizing the change the merchant takes out his ICC card 9 and can take it e.g. to the bank for the procession of the off-line payments. It is not excluded also the procession of this kind of ICC card 9 directly in the ATM machines. This solution has the advantage also in the fact that the ICC card is easy to operate, is of practical parameters and by its taking out of the Sales Device's 2 its theft from the business premises e.g. overnight and similar is prevented. The ICC card 9 also offers the area for the subsequent operation and backup of data in the computer with a simple reader.

The advantage of the configuration according to this example is also the possibility that one device with the reader, display 14 and keyboard 13 can be used by several merchants working in shifts in one business premises, while the payments are processed for the benefit of the corresponding merchant who has his ICC card 9 inserted in the reader at the moment.

Example 3

Figure 5:
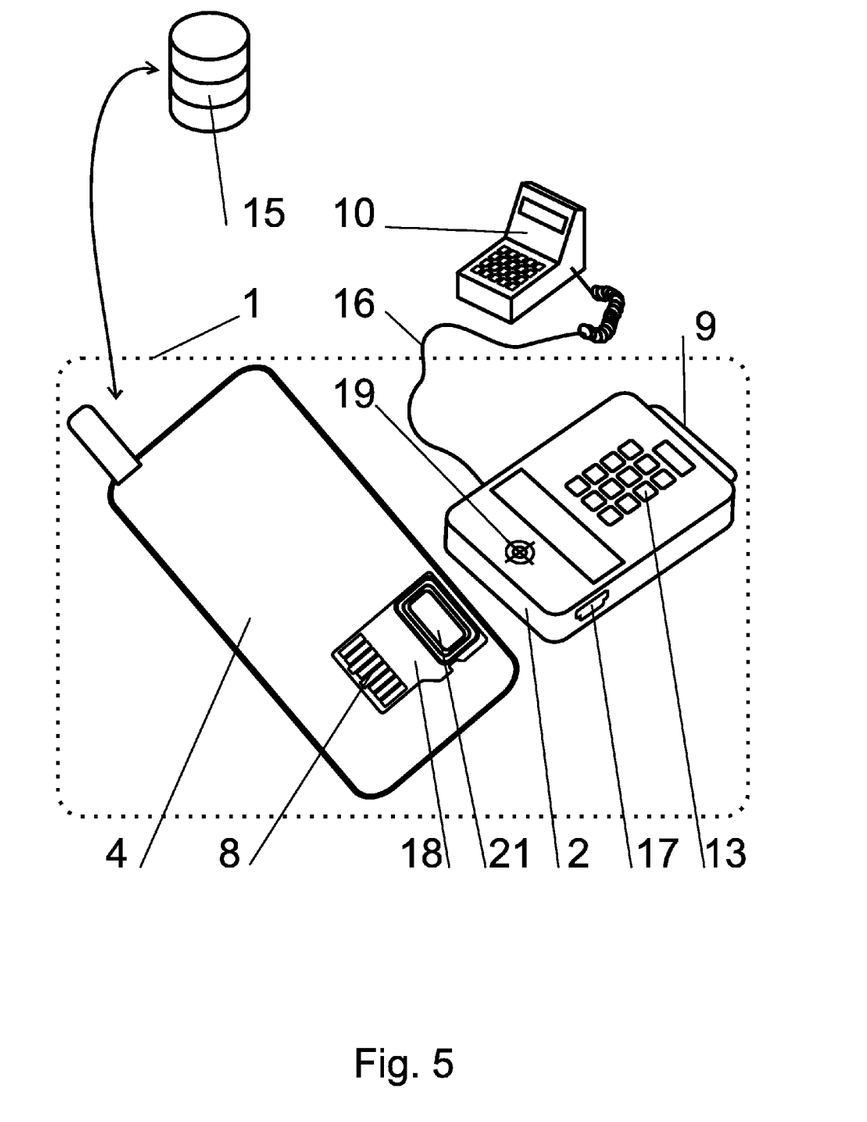
Figure 6:
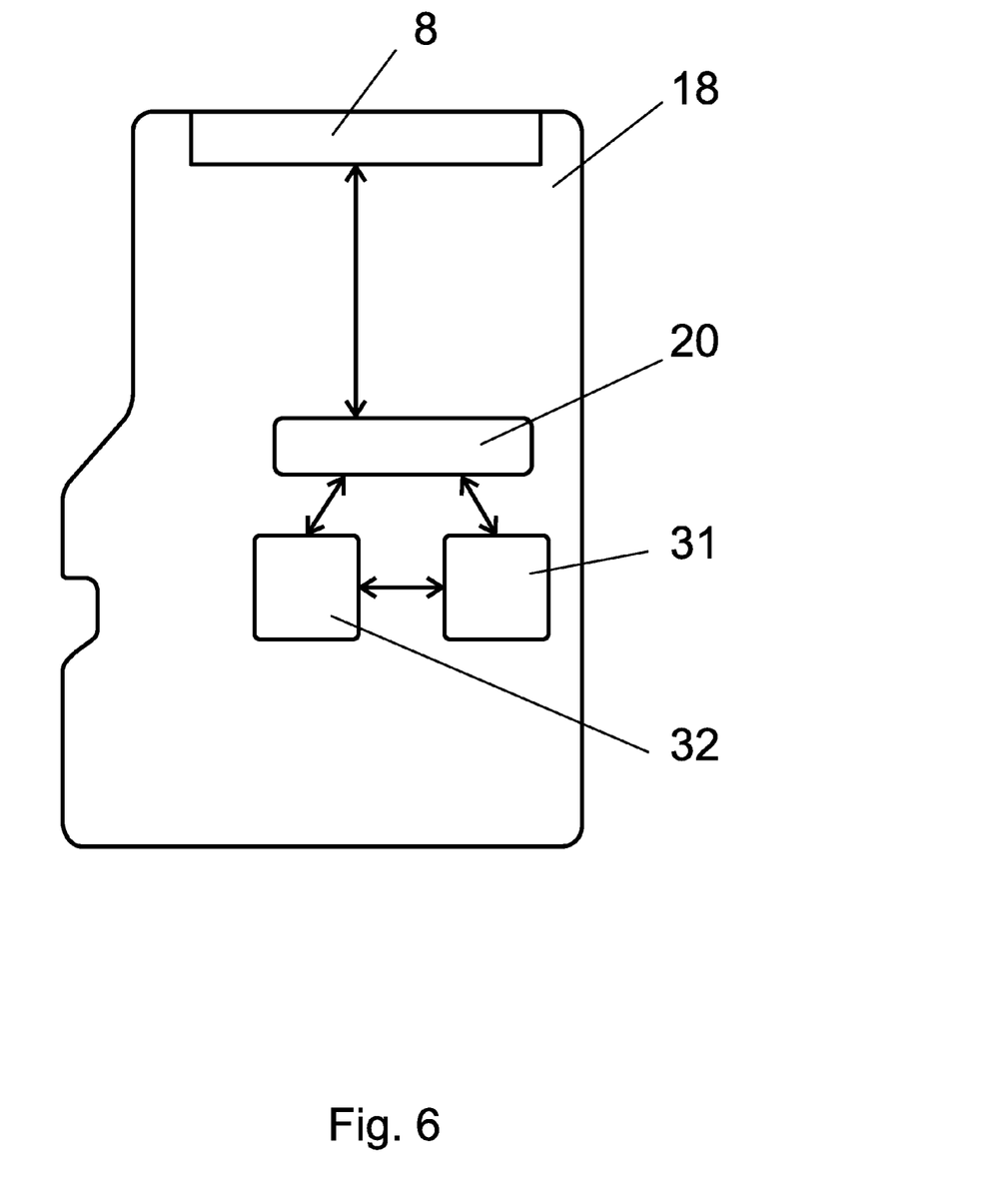
Figure 7:
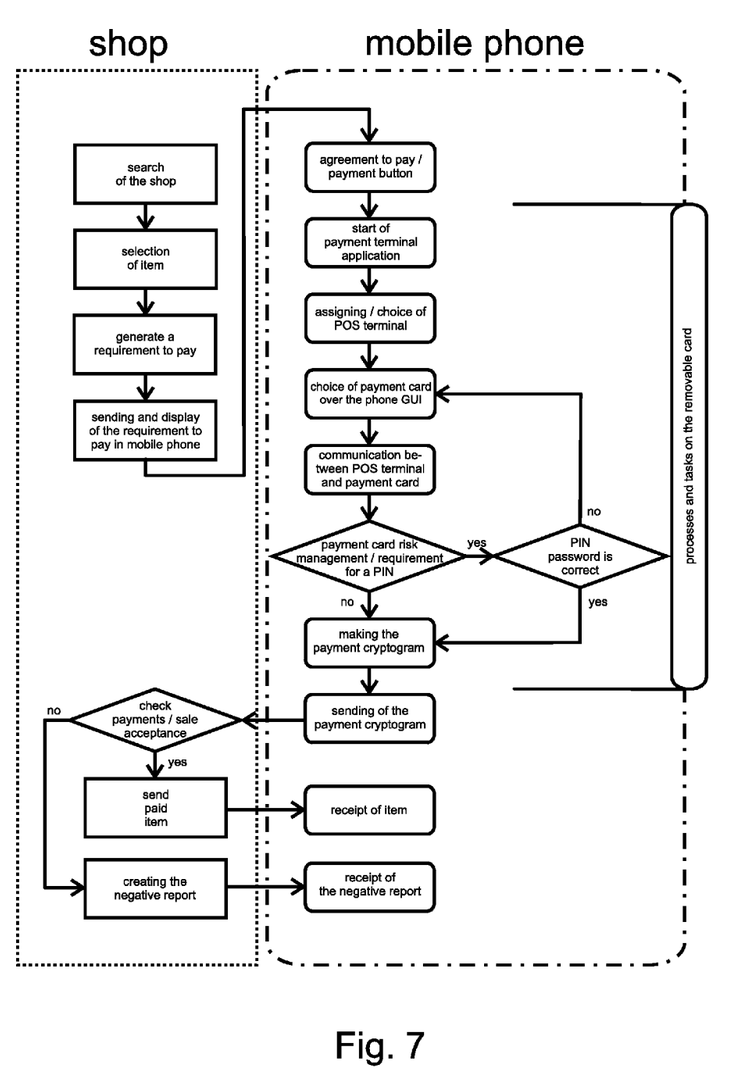
Figure 8:
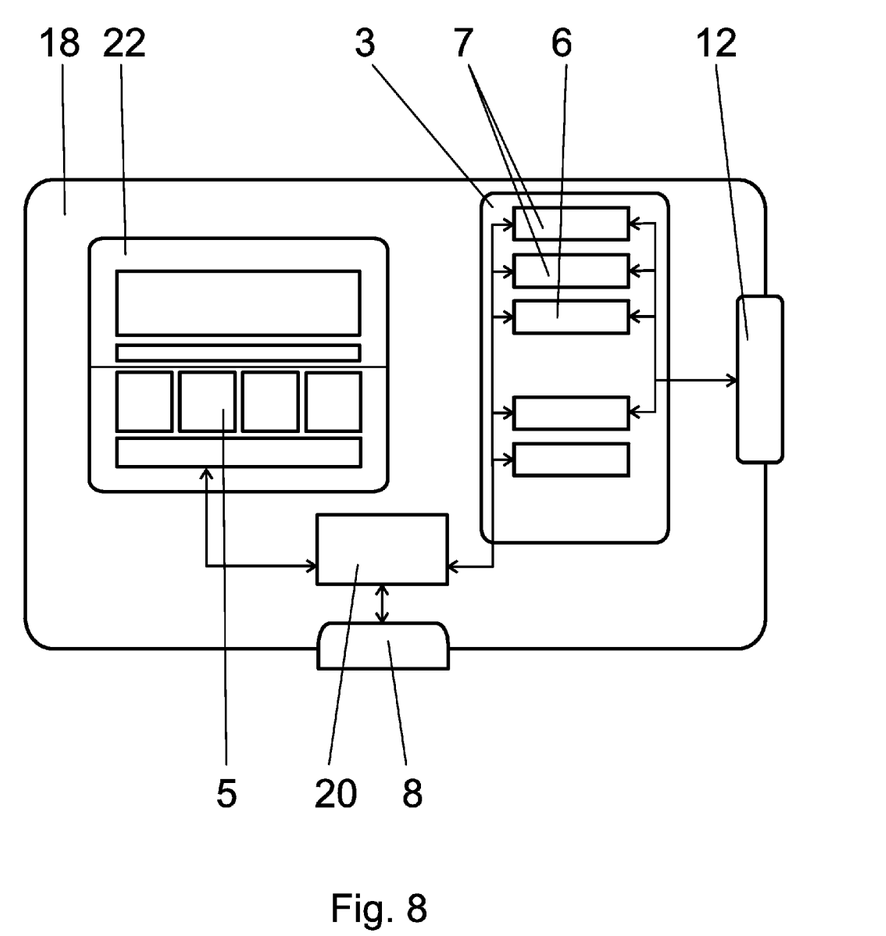

Besides the elements mentioned in the previous examples, the Sales Device 2 according to the FIG. 5 contains also the RS232 (Recommended Standard 232) interface through which it can be connected to the cash registrar 10. In this example the Sales Device 2 is basically an enhancement of the merchant's existing cash registrar 10 so it becomes a POS terminal 1; however, the payment terminal application can run again on the removable memory card 18, which is held by the customer along with the mobile communication device 4.

The result from the cash registrar 10 is transferred into the Sales Device 2 over the cable connection 16. There the result appears on the display 14 and the merchant confirms it by a confirming button. Subsequently the process runs in the same way as if the paid amount was entered over the Sales Device's 2 keyboard 13. In this configuration it would not even be necessary for the Sales Device 2 to contain a keyboard 13 for the entry of the paid amount, however due to the usability of the Sales Device 2 in various systems' point of view, the keyboard 13 is part of the Sales Device 2 even in this example.

INDUSTRIAL APPLICABILITY

The industrial applicability is obvious. With this invention, it is possible to industrially and repeatedly manufacture and use the POS payment terminals, which are created temporarily for the purpose of a specific payment by a connection of Sales Device and the mobile communication device. The necessary structures of the merchant's POS terminal are then created only after the connection with the removable memory card in the mobile communication device of the paying user is established.

LIST OF RELATED SYMBOLS

1—a POS payment terminal
2—a Sales Device
3—a Secure Element
31—the POS terminal's Secure Element
32—the payment card's Secure Element
4—a mobile communication device
5—a payment POS terminal application
6—a memory with terminal's configuration data
7—a payment card unit
8—an interface
9—an ICC card
10—a cash registrar
11—a communication element of the Sales Device 12—a communication element of the removable memory card
13—a keyboard
14—a display
15—a payment processing centre
16—a connection to the cash register
17—a external connector
18—a removable memory card
19—a target symbol
20—a microcontroller
21—the removable memory card's antenna
22—a memory
23—a Sales Device's antenna
24—a SAM card
25—a communication connection

The invention claimed is:

1. A payment terminal using a mobile communication device, the payment terminal comprising:
a memory having at least one secured part for storing the payment terminal's configuration data and for separately storing a payment card unit with a payment terminal application;
an interface; and
a microcontroller connected with the secured part of the memory and through the interface to the mobile communication device's circuits,
wherein the payment terminal, along with the payment terminal's corresponding configuration data, is located on a removable memory card owned by the customer, the removable memory card being configured to be inserted into a hardware slot that is used to add functionalities that surpass the basic functions of the mobile communication device, the memory card including a contactless communication element,
the payment terminal further comprising:
an initiator of the payment terminal application including an initializing file that is provided to the memory card to launch the payment terminal application, the initiator being located in the memory and containing a unit generating the payment's value, wherein the initiator is owned by the merchant receiving the payment, the initiator being equipped with a communication element that is compatible with the contactless communication element on the removable memory card.

2. The payment terminal as in claim 1, wherein the secured part of the memory for storing the payment terminal's configuration data and the payment card unit is formed as independent domains of one secure element, or the secured part of the memory for storing the payment terminal's configuration data is formed by a first secure element that is a separate piece of hardware from a second secure element that stores the payment card unit.

3. The payment terminal as in claim 1, wherein the removable memory card is of the SD type, miniSD type, microSD type, or M2 type, and the interface is of the SD type or M2 type.

4. The payment terminal as in claim 1, wherein the microcontroller contains an undeletable internal memory and a boot-loader unit for unauthorized interventions control in a loaded payment terminal application.

5. The payment terminal as in claim 1, wherein the contactless communication element in the memory card is connected to the secured part of the memory or to the microcontroller, and wherein the memory card includes an antenna thereon that is connected to the contactless communication element.

6. The payment terminal as in claim 1, wherein in the secured part of the memory there are at least two units with configuration data from different independent payment terminals.

7. The A payment terminal as in claim 1, wherein in the secured part of the memory there are at least two units holding independent payment cards with corresponding payment applications.

8. The payment terminal as in claim 1, wherein in the secured part of the memory there is a non-financial application unit.

9. The payment terminal as in claim 1, wherein the communication element of the initiator is compatible with a short distance communication element of the mobile communication device.

10. A method of performing a direct debit payment transaction using a mobile communication device that runs a payment terminal application, comprising:
the payment terminal application running on a removable memory card that is inserted into the mobile communication device's slot for additional hardware,
the payment terminal application being initiated by an initiator including an initializing file that is provided to the memory card to launch the payment terminal application and including a unit generating the value of the direct debit payment transaction, and
the initiator communicating with a payment card using the removable memory card's circuits,
wherein the payment terminal application is loaded into a microcontroller located in the memory card, and subsequently configuration data of the loaded payment terminal application are loaded from a secure element of the memory card.

11. The method of performing a direct debit payment transaction as in claim 10, wherein during or before initiation of a payment transaction a boot-loader unit runs change control in the payment terminal application.

12. The method of performing a direct debit payment transaction as in claim 10, wherein data representing the amount of a requested payment are inserted into the payment terminal application from the initiator, the initiator sending the data representing the requested payment, along with an initiation command, over a contactless communication channel to the payment card.

* * * * *